US007122710B2

(12) United States Patent
Margrave et al.

(10) Patent No.: US 7,122,710 B2
(45) Date of Patent: Oct. 17, 2006

(54) FLUORINATION OF POLYMERIC $C_{60}$

(75) Inventors: John L. Margrave, Bellaire, TX (US); Valery N. Khabashesku, Houston, TX (US); Zhenning Gu, Houston, TX (US); Valery Aleksandrovich Davydov, Moscow (RU); Aleksandra Viktorovna Rakhmanina, Moscow (RU); Lyudmile Stepanovna Kashevarova, Moscow (RU)

(73) Assignee: Wiiliam Marsh Rice University, Houston, TX (US)

(*) Notice: Subject to any disclaimer, the term of this patent is extended or adjusted under 35 U.S.C. 154(b) by 182 days.

(21) Appl. No.: 10/408,902

(22) Filed: Apr. 8, 2003

(65) Prior Publication Data
US 2004/0064004 A1    Apr. 1, 2004

Related U.S. Application Data

(60) Provisional application No. 60/370,753, filed on Apr. 8, 2002.

(51) Int. Cl.
*C07L 19/08*    (2006.01)
(52) U.S. Cl. .................................... 570/129
(58) Field of Classification Search ................ 570/130, 570/129
See application file for complete search history.

(56) References Cited

U.S. PATENT DOCUMENTS 5,364,993 A * 11/1994 Zhang et al. ............. 570/187
6,245,312 B1   6/2001 Blank et al.
2004/0062971 A1* 4/2004 Nuber ......................... 429/33

FOREIGN PATENT DOCUMENTS

JP          11126774 A   *  5/1999

OTHER PUBLICATIONS

Lovelace, "Aliphatic Fluorine Compounds", pp. 1-13 (1958).*
Iwasa, et al., "New Phases of C60 Synthesized at High Pressure", Science, vol. 264 (1994), p. 1570-1572.
Oszlanyi, et al., "Two-Dimensional Polymer of C60", Solid State Commun., vol. 93, No. 4 (1995), p. 265-267.
Xu, et al., "Theoretical Predictions for a Two-Dimensional Rhombohedral Phase of Solid C60", Phys. Rev. Lett., vol. 74, No. 2 (1995) p. 274-277.
Nunez-Regueiro, et al., "Polymerized Fullerite Structures", Phys. Rev. Lett., vol. 74, No. 2 (1995), p. 278-281.
Davydov, et al., "Structural Studies of C60 Transformed by Temperature and Pressure Treatments", Carbon, vol. 35, No. 6 (1997), p. 735-743.
Sundqvist, "Fullerenes under high pressures", Adv. in Phys., vol. 48, No. 1 (1999), pp. 1-134.
Makarova, et al., "Magnetic Carbon", Nature, vol. 413 (2001), p. 716-718.
Sundar, et al., "Pressure-induced polymerization of fullerenes: A comparative study of C60 and C70", Phys. Rev. B., vol. 53, No. 13 (1996), p. 8180-8183.
Moret, et al., "First X-ray diffraction analysis of pressure polymerized C60 single crystals", Europhys. Lett., vol. 40, No. 1 (1997), pp. 55-60.
Davydov, et al., "Spectroscopic study of pressure-polymerized phases of C60", Phys. Rev. B., vol. 61, No. 18 (2000), p. 11936-11945.

(Continued)

*Primary Examiner*—Michael L. Shippen
(74) *Attorney, Agent, or Firm*—Ross Spencer Garsson; Edward T. Mickelson; Winstead Sechrest & Minick P.C.

(57) ABSTRACT

The present invention is directed towards the fluorination of polymeric $C_{60}$ and towards the chemical and physical modifications of polymeric $C_{60}$ that can be accomplished through fluorination.

13 Claims, 9 Drawing Sheets

OTHER PUBLICATIONS

Long, et al., "Far-infrared vibrational properties of high-pressure high-temperature C60 polymers and the C60 dimer", Phys. Rev. B., vol. 61, No. 19 (2000), p. 13191-13201.

Arvanitidus, et al., "Raman modes of the two-dimensional tetragonal polymeric phase of C60 under high pressure", J. Chem. Phys., vol. 114, No. 20 (2001), p. 9099-9104.

Mickelson, et al., "Methylated and phenylated C60 from fluorinated fullerene precursors", J. Fluorine Chem, vol. 92 (1998), pp. 59-62.

Boltalina, et al., "Formation of C60F48 and fluorides of higher fullerenes", J. Chem. Soc. Perkin Trans., vol. 2 (1996), p. 2275-2278.

Taylor, "General and Inorganic Chemistry, Progress in fullerence fluorination", Russ. Chem. Bull., vol. 47, No. 5 (May 1998) p. 823-832.

Taylor, et al., "Oxygenated Species in the Products of Fluorination of [60]- and [70]-Fullerene by Fluorine Gas", J. Chem. Soc. Perkin Trans., vol. 2 (1995) p. 181-187.

Okino, et al., "Crystal Structure of C60Fx", Fullerene Sci. & Tech., vol. 1, No. 3(1993), p. 425-436.

Kawasaki, et al., "Crystal Structures of the Fluorinated Fullerenes C60F36 and C60F48", J. Phys. Chem. B., vol. 103 (1999), pp. 1223-1225.

Mickelson, et al., "Fluorination of single-wall carbon nanaotubes", Chem. Phys. Lett., vol. 296 (1998), pp. 188-194.

Gahk, et al., "Highly Fluorinated Fullerenes as Oxidizers and Fluorinating Agents", Tetrahedron Lett., vol. 34, No. 45 (1993) p. 7167-7170.

Selig, et al., "Fluorinated Fullerenes", J. Am. Chem. Soc., vol. 113 (1991), pp. 5475-5476.

Hamwi, et al., "Fluorination of Carbon Nanotubes", Carbon, vol. 35, No. 6 (1997), pp. 723-728.

Cox, et al., "X-ray photoelectron and NMR studies of polyfluorinated C60 . . . ", J. Am. Chem. Soc., vol. 116 (1994), pp. 1115-1120.

Kniaz, et al., "Fluorinated Fullerenes: Synthesis, Structure, and Properties", J. Am. Chem. Soc., vol. 115 (1995) pp. 6060-6064.

Holloway, et al., "Fluorination of Buckminster Fullerene", J. Chem. Soc. Chem. Commun., (1991), pp. 966-969.

Tuinman, et al., "Hyperfluorination of Buckminsterfullerene: Cracking the Sphere", vol. 115, (1993) pp. 5885-5886.

Davydov, et al., "Particularities of C60 Transformations at 1.5 GPa", J. Phys. Chem. B., vol. 103 (1999), pp. 1800-1804.

* cited by examiner

A

B

FLUORINATION OF POLYMERIC $C_{60}$

CROSS REFERENCE TO RELATED APPLICATIONS

The present application claims priority to the following U.S. Provisional Patent Application: Ser. No. 60/370,753 filed Apr. 8, 2002.

This invention was made with support from the Robert A. Welch Foundation (Grant Nos. C-0109 and C-0689) and the Texas Higher Education Coordinating Board's Advanced Technology Program (Grant Nos. 003604-0026-2001 and 003604-0055-1999).

TECHNICAL FIELD

The present invention relates generally to fullerene materials, and particularly to methods of their manipulation and modification.

BACKGROUND INFORMATION

Polymeric $C_{60}$ represents a new class of fullerene compounds created by the solid-state polymerization of $C_{60}$ monomers under high-pressure, high-temperature treatment (HPHTT) (Iwasa et al., *Science* 264, 1570 (1994); Oszlanyi et al, *Solid State Commun.* 93, 265 (1995); Xu et al., *Phys. Rev. Lett.* 74, 274 (1995)). Depending on the temperature and pressure of the process, chain-like 1D phase (O-phase) or layered 2D phase (T-, R-phase) polycrystalline polymers can be obtained (Nunez-Regueiro et al., *Phys. Rev. Lett.* 74, 278 (1995); Davydov et al., *Carbon* 35, 735 (1997)) (See FIG. 1). Some of these crystalline polymeric $C_{60}$ species have demonstrated interesting mechanical (Sundqvist *Adv. Phys.* 48, 1 (1999)) and magnetic properties (Makarova et al., *Nature* 413, 716 (2001)). The crystalline structures of the polymeric $C_{60}$s have been carefully determined and documented through comparison studies of the experimental and calculated XRD patterns (Iwasa et al., *Science* 264, 1570 (1994); Nunez-Regueiro et al., *Phys. Rev. Lett.* 74, 278 (1995); Sundar et al., *Phys. Rev. B* 53, 8180 (1996); Moret et al., *Europhys. Lett.* 40, 55 (1997); Davydov et al., *Phys. Rev. B* 61, 11936 (2000)). Also, the vibrational spectra (Raman and infrared (IR)) of these polymers have been thoroughly investigated and the main vibrational modes have been tentatively assigned (Davydov et al., *Phys. Rev. B* 61, 11936 (2000); Long et al., *Phys. Rev. B* 61, 13191 (2000); Arvanitidis et al., *J. Chem. Phys.* 114, 9099 (2001)). Despite such careful analysis of this new material, little has been done to garner a better understanding of the chemical properties of the polymeric $C_{60}$.

SUMMARY OF THE INVENTION

The present invention is directed towards the fluorination of polymeric $C_{60}$ and towards the chemical and physical modifications of polymeric $C_{60}$ that can be accomplished through fluorination.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
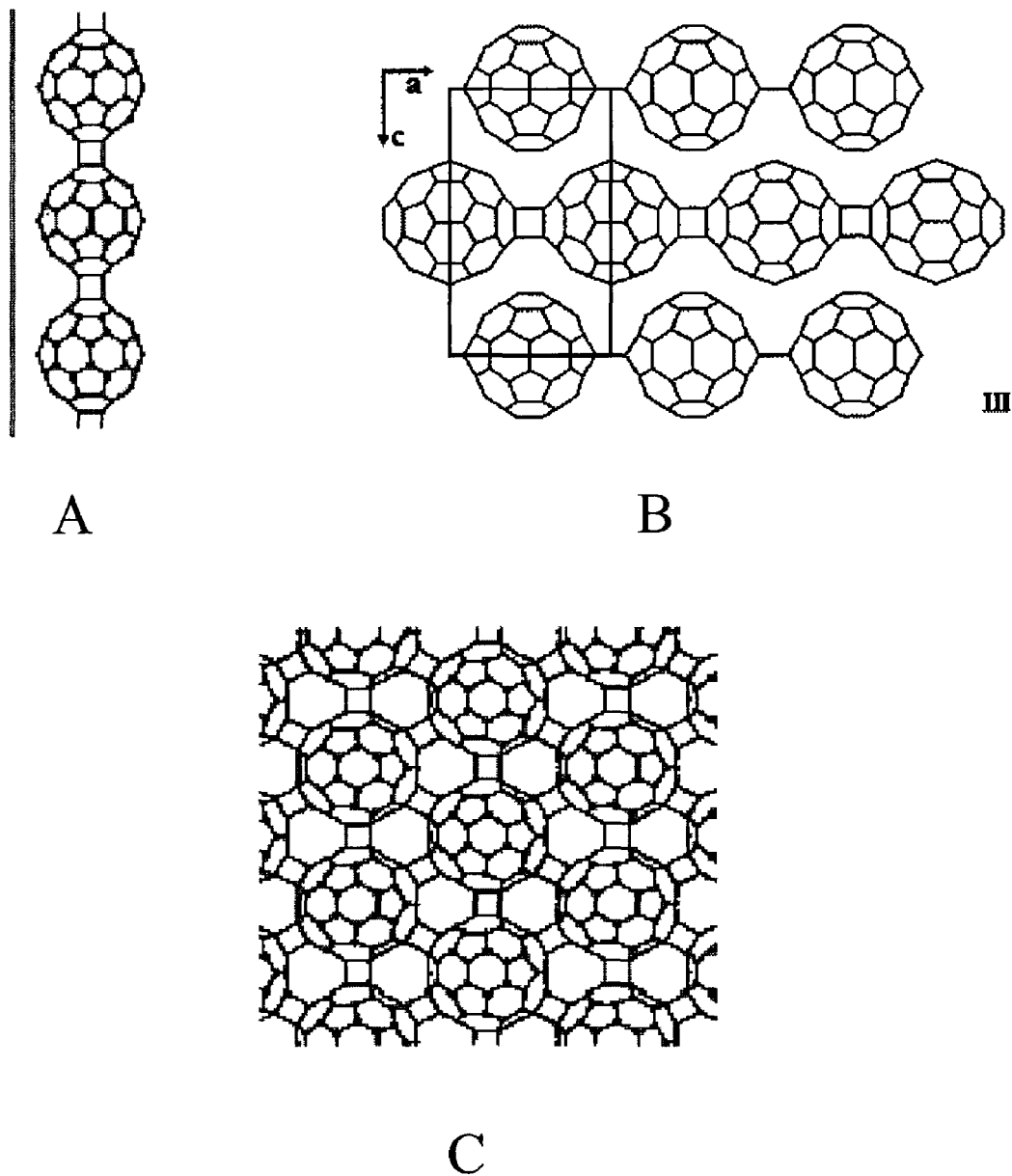
FIG. 1 illustrates (a) O-phase polymeric $C_{60}$, (b) T-phase polymeric $C_{60}$, and (c) R-phase polymeric $C_{60}$.

The present invention is directed towards the fluorination of polymeric $C_{60}$. While not intending to be bound by theory, at least three polycrystalline polymeric phases can be fluorinated. The three polycrystalline polymeric phases (O, T, R) are illustrated in FIG. 1, wherein (a) is the O-phase polymeric $C_{60}$, (b) is the T-phase polymeric $C_{60}$, and (c) is the R-phase polymeric $C_{60}$. While the reactivity towards a fluorinating agent differs somewhat among these three distinct phases (O, T, and R), they all possess a higher reactivity than monomeric $C_{60}$. This translates into lower reaction temperatures and shorter reaction times for a given fluorinating agent, and allows for the use of weaker fluorinating agents than might typically be used to fluorinate monomeric $C_{60}$. Furthermore, while undergoing fluorination at sufficiently high temperature, each of these three phases can revert back to a monomeric species in which at least some of the monomers have some fluorine covalently attached. Such fluorination of polymeric $C_{60}$ allows for the chemical manipulation and derivatization (functionalization) of polymeric $C_{60}$ in ways that are analogous to that seen for monomeric $C_{60}$ (Mickelson et al., *J. Fluorine Chemistry* 92, 59–62 (1998), incorporated herein by reference). Such fluorination and/or subsequent derivatization can render the polymeric $C_{60}$ species soluble in a variety of solvents, thus enhancing its manipulatablity.

Embodiments of the present invention that are directed towards fluorinating polymeric $C_{60}$ can be generally described as comprising the following steps: (1) selecting a quantity of polymeric $C_{60}$, and (2) exposing said polymeric $C_{60}$ to a fluorinating agent to form a novel fluorinated polymeric $C_{60}$ material.

In selecting a quantity of polymeric $C_{60}$, the material can be made by any known method, and generally is formed by high-temperature high-pressure processes (Iwasa et al., *Science* 264, 1570 (1994); Oszlanyi et al., *Solid State Commun.* 93, 265 (1995); Xu et al., *Phys. Rev. Lett.* 74, 274 (1995)). The polymeric $C_{60}$ can be selected from the group consisting of O-phase, T-phase, R-phase, and combinations thereof. The purity of the polymeric material (in terms of single-phase component) varies generally from at least about 75 weight percent to at most about 99.5 weight percent, and specifically from at least about 85 weight percent to at most about 99 weight percent.

In selecting a quantity of polymeric $C_{60}$ according to the present invention, a mass quantity is typically selected. The mass quantity of $C_{60}$ varies generally from at least about 1 milligram to at most about 1 gram, and specifically from at least about 10 milligrams to at most about 100 milligrams.

In the step of exposing said polymeric $C_{60}$ to a fluorinating agent to form a novel fluorinated polymeric $C_{60}$ material, a fluorinating agent is selected along with a number of experimental variables. Experimental variables, according to the present invention may include one or more of the following: an optional diluent for the fluorinating agent; partial pressure of the fluorinating agent; flow rate of the fluorinating agent and optional diluent (if a flow reactor); temperature of the process; and exposure time.

A fluorinating agent, according to the present invention, can be any fluorinating agent that suitably provides for a fluorinated polymeric $C_{60}$ product. Such fluorinating agents include, but are not limited to, $F_2$, $ClF_3$, $BrF_3$, $IF_5$, HF, $XeF_2$, and combinations thereof.

An optional diluent, according to the present invention can be any inert species that suitably serves to dilute the concentration of the fluorinating agent. Such diluents include, but are not limited to, He, $N_2$, Ar, Kr, and combinations thereof.

The pressure or partial pressure (if diluted) of the fluorinating agent can be any pressure that suitably provides for a fluorinated polymeric $C_{60}$ product according to the present invention. Such pressures can range generally from at least about 0.1 torr to at most about 10,000 torr, and specifically from at least about 1 torr to at most about 1000 torr.

Flow rates of the fluorinating agent and optional diluent can be any flow rate which suitably provides for the fluorinated polymeric $C_{60}$ product of the present invention. Such flow rates range generally from at least about 0.1 cubic centimeters per minute (cc/min) to about 10,000 cc/min, and specifically from at least about 0.1 cc/min to at most about 1000 cc/min.

The temperatures at which polymeric $C_{60}$ is exposed to the fluorinating agent can be any temperatures that suitably provided for a fluorinated polymeric $C_{60}$ product according to the present invention. Such temperatures range generally from least about 0° C. to at most about 300° C., and specifically from least about 100° C. to at most about 200° C. The temperature at which polymeric $C_{60}$ is exposed to the fluorinating agent can be varied and ramped during the exposure process (i.e., the fluorinating reaction).

The exposure time (reaction duration) can be any length of time that suitably provides for a fluorinated polymeric $C_{60}$ product according to the present invention. Such exposure time ranges generally from at least about 1 second to at most about 1 month, and specifically from at least about 1 minute to at most about 10 hours. In some embodiments, the exposure is discontinuous and carried out in intervals or steps.

Methods of fluorinating polymeric $C_{60}$, according to the present invention, can yield fluorinated polymeric $C_{60}$ products comprising polymeric $C_{60}$ and fluorine, wherein said fluorine is covalently attached to the polymeric $C_{60}$ backbone. Such products, according to the present invention, can comprise a range of C:F ratios. Such products can be stoichiometrically homogeneous (uniform) throughout, and/or they can vary thoughout the product. The fluorinated polymeric $C_{60}$ of the present invention has a stoichiometry $C_{60}F_x$, where x ranges generally from at least about 0.1 to at most about 42, and specifically from at least about 2 to at most about 42.

It should be noted that in fluorinating the polymeric $C_{60}$, the various parameters (e.g., quantity, purity, reaction time, etc.) are all interrelated and based on purities and experimental quantities currently available. As methods of making these precursors improve, such processes described here can be scaled up, and such scaled up processes should be deemed to fall within the scope of the present invention.

In some embodiments of the present invention, the fluorinated polymeric $C_{60}$ is suspendable in a solvent. Suitable solvents for suspending fluorinated polymeric $C_{60}$ include, but are not limited to, hexane, chloroform, ethylene diamine, methanol, isopropanol, and combinations thereof.

In some embodiments of the present invention, the fluorinated polymeric $C_{60}$ is reacted with a strong nucleophile, wherein the strong nucleophile substitutes for at least some of the fluorine covalently attached to the polymeric $C_{60}$ backbone. Suitable strong nucleophiles can be any strong nucleophile(s) which suitably substitute for at least some of the fluorine, according to the present invention. Such strong nucleophiles include, but are not limited to, lithium alkyls, Grignard reagents, sodium alkoxides, amines, and combinations thereof.

In some embodiments of the present invention, the fluorinated polymeric $C_{60}$ can be depolymerized to yield a monomeric product. Such depolymerizations occur in an environment comprising fluorine and a temperature which is typically elevated in excess of 200° C. Such monomeric products comprise fluorinated and unfluorinated $C_{60}$.

In some embodiments of the present invention, the fluorinated polymeric $C_{60}$ can be defluorinated with a reducing agent. Such reducing agents include, but are not limited to, $H_2$, $N_2H_4$, $LiAlH_4$, $NH_3$, amines, and combinations thereof. Such defluorinations can be carried out on either the fluorinated polymeric $C_{60}$, or on a depolymerized product (described in the preceeding paragraph).

Possible uses for the fluorinated polymeric $C_{60}$ of the present invention include, but are not limited to, solid lubricants; electrochemical cells; carbon feromagnetic materials; and as inert fluorocarbons for laboratory apparatuses, piping, low-friction surfaces, and lubricants.

The following example is provided to more fully illustrate some of the embodiments of the present invention. The example illustrates methods by which polymeric $C_{60}$ can be fluorinated. It should be appreciated by those of skill in the art that the techniques disclosed in the examples which follow represent techniques discovered by the inventor to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE

Fluorination of Polymeric $C_{60}$

The polymeric $C_{60}$s used in this example were prepared from high-purity, small crystalline fullerite $C_{60}$ with high-pressure high-temperature treatment (HPHTT). The p, T parameters for the synthesis of the O-, T- and R-phase were 1.5 Gpa, 720 K; 2.3 Gpa, 775 K; and 6 Gpa, 873 K, respectively. The purity of the polymers is 95%, 98%, 99.5% for O-, T- and R-phase, respectively. All the samples were carefully ground to fine powders before transferring them into a flow-gas reactor in an effort to maximize the area exposed to the fluorine gas. Also, under each set of reaction conditions, the approximately 50 milligram samples from each of the three phases were separately loaded into small Monel foil boats and then collectively transferred into the reactor all at once, so as to guarantee all samples would be treated equivalently. Once the samples were loaded, the reactor was sealed and purged with helium at room temperature for 2 hours to remove any residual air and moisture that may have adsorbed onto the samples. The reactor was then heated to the appropriate reaction temperature under continuous helium flow before fluorine and hydrogen were introduced into the reactor. The flow rates of fluorine and hydrogen were 3 cc/min and 1 cc/min, respectively. Hydrogen was used to react with fluorine to produce HF and subsequently facilitate the fluorination. The concentrations of fluorine and HF in the final gas mixture (helium diluted) were both 10%. Reactions were conducted at 50° C., 100° C., 150° C., 200° C. and 250° C., each for one hour.

Transmission mode IR spectra were collected by mixing the samples with KBr powder and molding this mixture into pellets. IR spectra were acquired using a Fourier transform IR spectrometer (FTIR). Powder X-ray diffraction analysis of the polymers and their fluorinated products was carried out using an INEL CPS 120 position-sensitive detector with $CuK\alpha_1$ radiation. A Philips environmental-mode scanning electron microscope (SEM) with an attached energy dispersive spectrometer (EDS) accessory was used to investigate the microcrystalline structure and to determine the elemental analysis (i.e., stoichiometries) of the samples.

All three phases of the polymeric $C_{60}$ were found to be unaffected by $F_2$/HF exposure at 50° C. for one hour. Starting with the 100° C. reaction, the polymers began to react with the $F_2$/HF. The stoichiometries of the $F_2$/HF-treated polymers were determined by EDS. The results for all the reaction temperatures are listed in Table 1. According to Table 1, under each set of fluorinating conditions, the three polymer phases reacted to a different extent. At 100° C., fluorine addition to the T-phase polymer was very low, with an average of less than three fluorine atoms per $C_{60}$ cage; the O-phase polymer had about six fluorine atoms added to every $C_{60}$ cage; the R-phase, however, obtained a relatively high fluorine uptake: about ten fluorine atoms per $C_{60}$ cage. At 150° C., the fluorine uptake amounts were close for all three polymers, which is 16–19 fluorine atoms per $C_{60}$ cage. This means that for the O- and T-phase polymers, there is a large increase in fluorine uptake between 100° C. and 150° C. A similar increase in fluorine uptake amounts was observed for all three polymers when the reaction temperature was increased from 150° C. to 200° C., where the number of fluorine atoms per $C_{60}$ cage became 30 for the O-phase polymer, 38 for the T-phase polymer, and 42 for the R-phase polymer.

Even though these are average values, it is apparent that all three polymers have higher reactivity towards fluorination than monomeric $C_{60}$ under the same conditions. While not intending to be bound by theory, it is believed that the cross-linking between $C_{60}$ cages distorts the overall electron density around the $C_{60}$, thus creating more reactive sites around the cages. At 250° C., the fluorine uptake amounts showed a sharp decrease for all three polymers, which, as confirmed by spectroscopic data, was due to the decomposition of the polymers at this temperature under the $F_2$/HF atmosphere. Overall, the R-phase polymer seems to have the highest reactivity towards fluorine addition. While not intending to be bound by theory, this could be because with 12 carbon atoms per $C_{60}$ cage forming cross-linking bonds with other surrounding $C_{60}$s, the extent of distortion on the electron density geometry in the R-phase polymer is the highest of all three polymers. This relationship between the cross-linking pattern and the reactivity towards fluorination is consistent with the tendency of fluorine uptake amounts among the three polymers observed in our experiment, i.e., the O-phase polymer with 4 carbon atoms per $C_{60}$ cage forming cross-linking bonds with other $C_{60}$s, has the lowest fluorine uptake; and the T-phase polymer, with 8 carbon atoms per $C_{60}$ cage forming cross-linking bonds with other $C_{60}$s, has fluorine uptake amounts somewhere between the O- and R-phase polymers. This is notable because it demonstrates the effect the covalent bonds between $C_{60}$ cages within the polymers have on the chemical properties of the buckyballs.

TABLE 1

F/C Ratio (in atomic %) of $C_{60}$ Polymers fluorinated at various temperatures.

| | 100° C. | 150° C. | 200° C. | 250° C. |
| --- | --- | --- | --- | --- |
| O-phase poly-$C_{60}$ | 9.9 | 29.9 | 51.8 | 43.4 |
| T-phase poly-$C_{60}$ | 43 | 32.7 | 63.5 | 42.1 |
| R-phase poly-$C_{60}$ | 17.3 | 27.1 | 70.6 | 50.6 |

Figure 2:
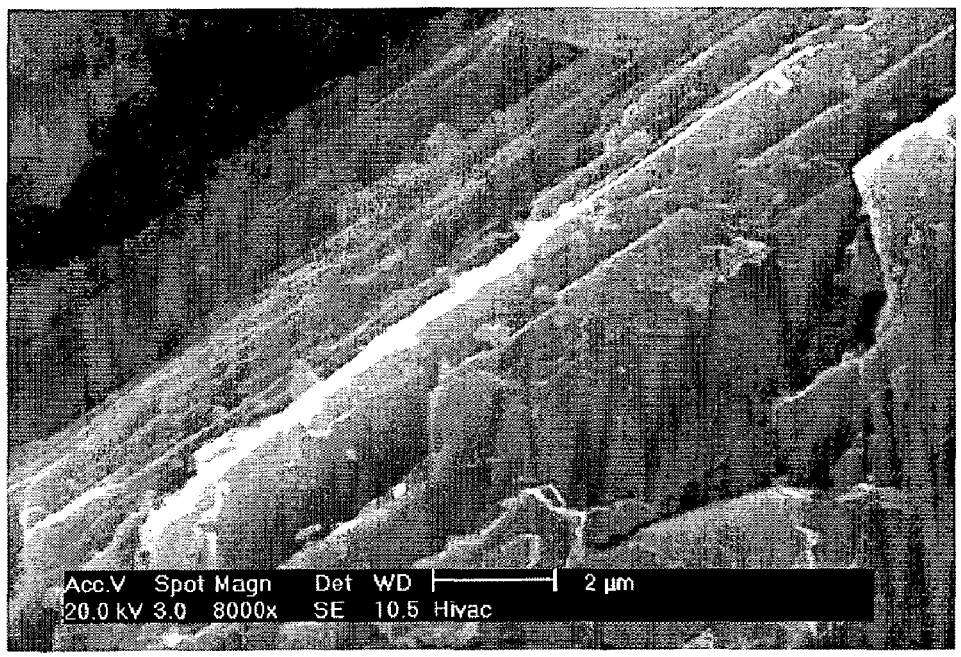
FIG. 2 illustrates SEM images of T-phase polymeric $C_{60}$, wherein (a) is the pristine material and (b) is the material fluorinated at 100° C. for one hour.
Figure 2:
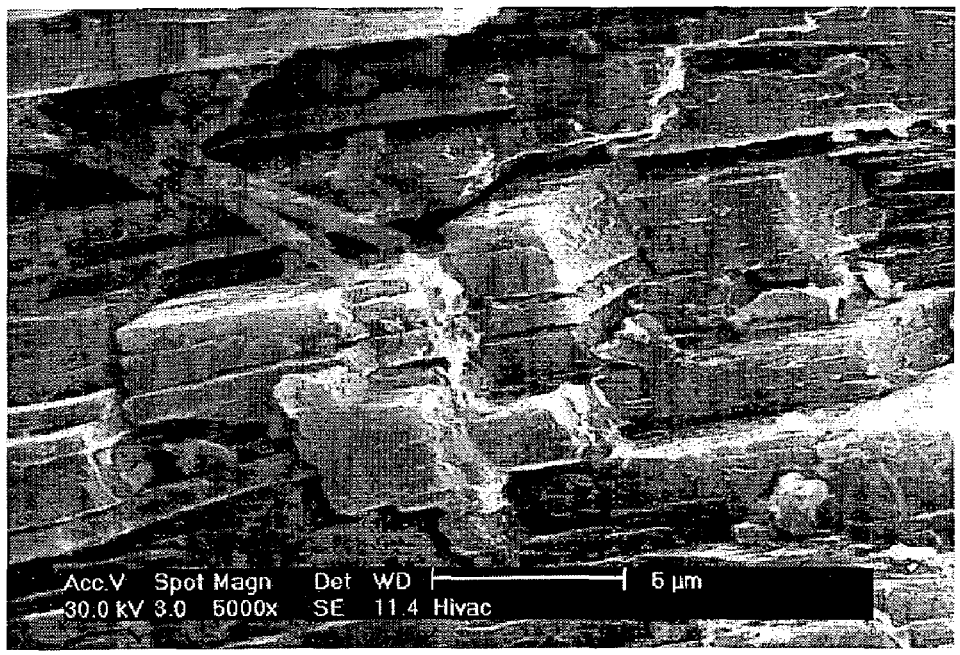
Figure 3:
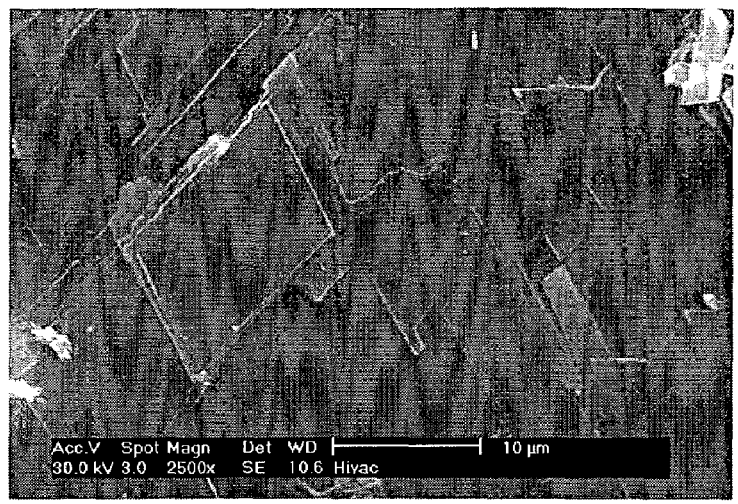
FIG. 3 illustrates SEM images of R-phase polymeric $C_{60}$, wherein (a) is the pristine material and (b) and (c) are the material fluorinated at 150° C. for one hour.
Figure 3:
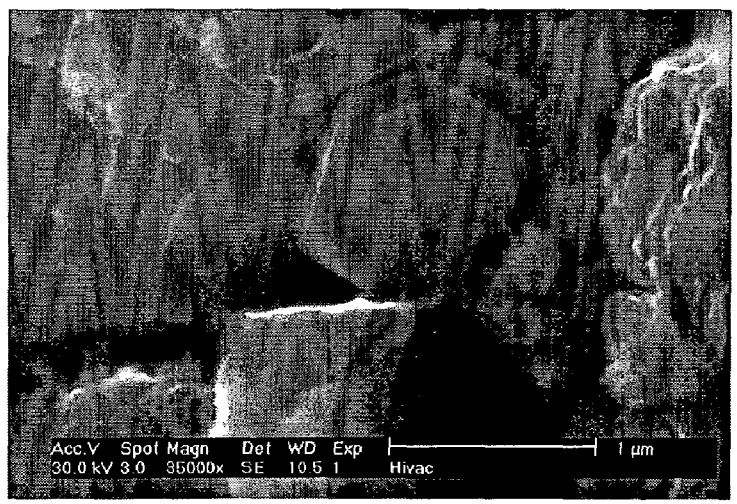
Figure 3:
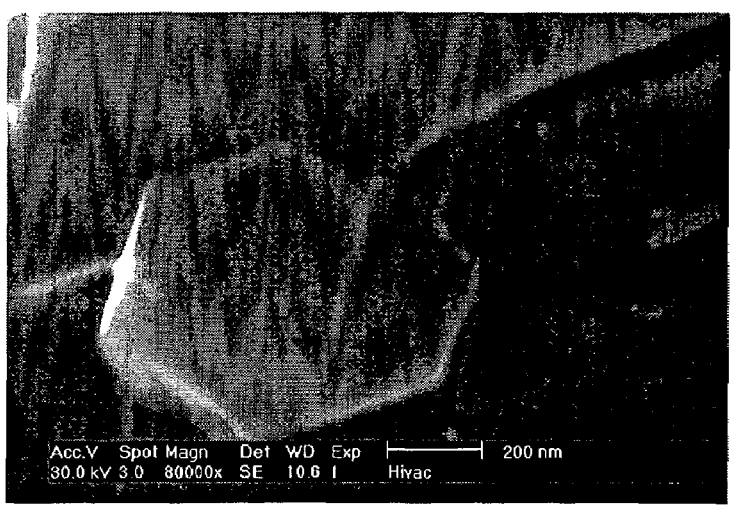

SEM images of the polymeric $C_{60}$s were used as experimental verification of their crystalline structure assignments based on calculated XRD patterns (Davydov et al., *Phys. Rev. B* 61, 11936 (2000)). SEM observations of the polymers before fluorination were consistent with the previous work (FIG. 2(*a*) and FIG. 3(*a*)). It was even possible to capture the large symmetric crystallites under the microscope that represent the lattice structure of the polymers, as shown in FIG. 2(*a*). Some of the fluorinated polymers were also investigated with SEM. FIG. 2(*b*) shows the SEM image of the T-phase polymer fluorinated at 100° C. FIGS. 3(*b*) and (*c*) are images of the R-phase polymer fluorinated at 150° C. Based on the SEM images, addition of small amounts fluorine failed to alter the morphology of the crystalline polymers. As can be seen clearly from FIG. 2(*b*), the typical crystalline pattern was maintained during the fluorination. However, discontinuity in the long range crystalline structure was observed. The discontinuity, as well as the hexagonal microcrystallites observed in FIGS. 3(b) and (c), suggest the disintegration of larger crystallites caused by the repulsive interaction between fluorine atoms added along the edges of crystalline grains.

IR Spectra

The IR spectra provide important information about the bonding between fluorine and carbon within the fluorinated polymers and the effects of such bonding on the molecular symmetry and therefore the vibrational spectra of the polymers. Also, by comparing the IR spectra of the polymers fluorinated at increased temperatures, the relative tendency of reactivity and chemical stability of the polymers could be determined.

O-phase $C_{60}$ polymer. The IR spectrum of the pristine O-phase polymer (FIG. 4(a)) is compared with published data (Davydov et al., Phys. Rev. B 61, 11936 (2000)). In general, the IR modes are consistent with the published data with few exceptions. For example, the 576 cm$^{-1}$ $F_{1u}$ mode split into 571 and 576 cm$^{-1}$ bands. The IR-silent $F_{1g}$(2) mode at 965 cm$^{-1}$ was activated in this example. The difference might be caused by trace impurities.

After fluorination at 100° C. for one hour, a broad and low-intensity C—F stretching mode showed up in the range of 1050–1200 cm$^{-1}$, centering around 1120 cm$^{-1}$ (FIG. 4(b)). Broad features are typical of fluorinated fullerene products with variable stoichiometry (Boltalina et al., J. Chem. Soc. Perkin. Trans. 2 2275 (1996); Taylor, Russ. Chem. Bull. 47, 823 (1998)). Further differing from the fluorination of monomeric $C_{60}$, new vibrational modes sometimes arose in the IR spectrum. Since the appearance of new modes is generally due to the activation of the silent modes by fluorination, it is reasonable to expect that the polymerization of monomeric $C_{60}$ already activated those modes so that fluorination of these polymers does not introduce new features. As a result of fluorination, all modes belonging to the pristine polymer broadened. The intensity of these modes apparently weakened, especially the ones above 900 cm$^{-1}$. Some split modes, such as the ones at 531, 576, 717, and 736 cm$^{-1}$, disappeared after fluorination. Because the split modes in pristine polymers are due to symmetry breaking-down, it is possible that various fluorination patterns on different $C_{60}$ cages within the polymer evened out such splitting. Another notable effect is that most modes downshifted by 1–4 cm$^{-1}$. For example, the 543, 657, 710, 777, and 1324 cm$^{-1}$ modes each downshifted 2 cm$^{-1}$, the 923 cm$^{-1}$ mode downshifted 3 cm$^{-1}$, and the 1422 cm$^{-1}$ mode downshifted 4 cm$^{-1}$. This is expected because formation of C—F bonds should weaken the C—C bond strength throughout the polymer.

Figure 4:
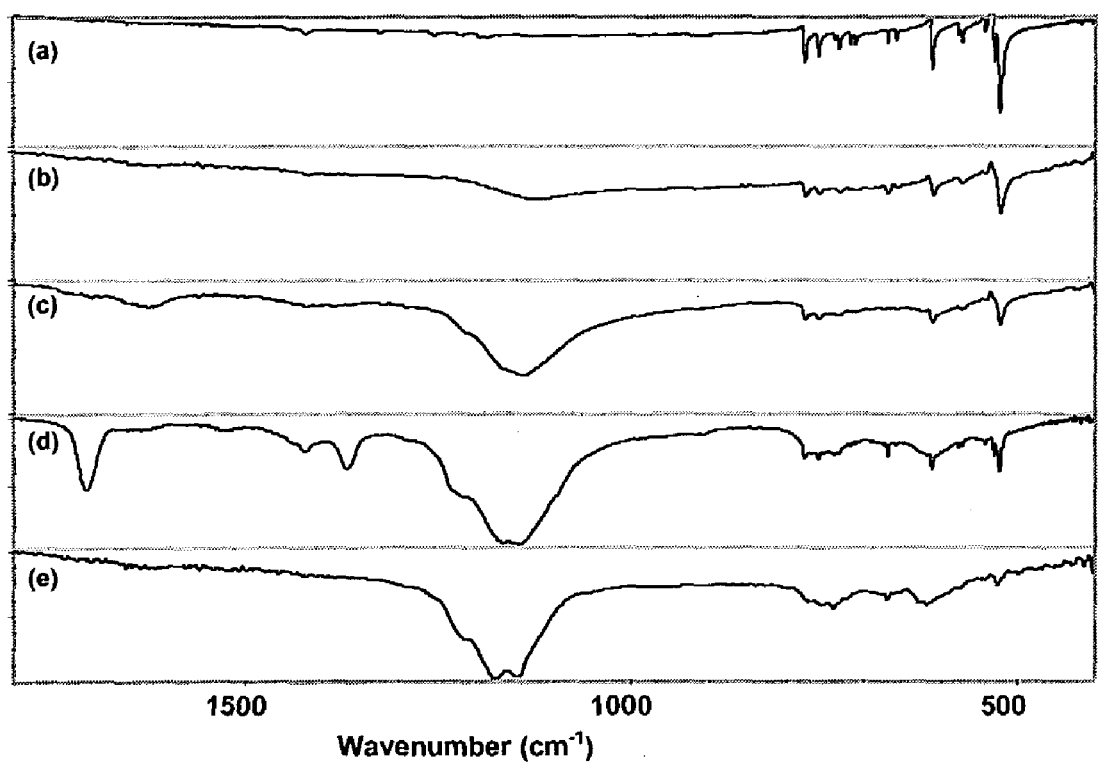
FIG. 4 illustrates IR spectra of O-phase polymeric $C_{60}$, wherein (a) is the pristine material, (b) is the material fluorinated at 100° C. for one hour (twice the original intensity), (c) is the material fluorinated at 150° C. for one hour (twice the original intensity), (d) is the material fluorinated at 200° C. for one hour, and (e) is the material fluorinated at 250° C. for one hour (twice the original intensity)

Fluorination of the O-phase polymer at 150° C. for one hour generated a broad, higher intensity C—F mode centered around 1150 cm$^{-1}$, as shown in FIG. 4(c). It shifted about 30 cm$^{-1}$ towards higher frequencies compared with the one in FIG. 4(b). This is an indication of a higher average C—F bond strength. Also, there is a very slight shoulder at ~1210 cm$^{-1}$ for the C—F mode in FIG. 4(c). Its increase with fluorination temperature, as shown in other spectra in FIG. 4, suggests that it represents another type of C—F bonding pattern, which is more covalent in bond nature. In the fingerprint range (400–900 cm$^{-1}$), the intensity of the features further decreased, with the 668 cm$^{-1}$ mode completely disappearing. While not intending to be bound by theory, this apparently is the result of more fluorine addition to the polymer because the average atomic F/C ratio is three times that shown in FIG. 4(a). Whereas, the fact that features in this range are not broader than the ones in FIG. 4(a) implies that higher fluorine addition does not cause higher randomness of fluorine distribution on the $C_{60}$ cages.

The IR of O-polymer fluorinated at 200° C., shown in FIG. 4(d) is quite different from FIGS. 4(b) and (c) in several aspects. First, the C—F stretching mode, which is still broad and centered around 1155 cm$^{-1}$, shows three fine structures at 1144, 1164 and 1220 cm$^{-1}$, respectively. Such fine structures are a typical indication of better-defined fluorine addition patterns, i.e., fewer differently fluorinated components (Boltalina et al., J. Chem. Soc. Perkin. Trans. 2 2275 (1996)). Second, in the 400–900 cm$^{-1}$ fingerprint range, instead of having broad, non-split modes, all original features of the pristine polymers showed up almost as sharp as they are in FIG. 4(a). These sharp peaks are superimposed on two broad features, one at 580–650 cm$^{-1}$, the other at 700–800 cm$^{-1}$. While not intending to be bound by theory, the spectrum is believed to result from a mixture of the unchanged polymer and the highly fluorinated polymer. This is probably because at 200° C., the diffusion of fluorine into the crystalline polymer was greatly hindered due to the vigorous lattice vibration. As a result, the rate of fluorine addition on the surface of the polymer greatly exceeded that of the fluorine diffusion. Within the one hour reaction time, a product with a highly fluorinated surface layer and barely affected inner polymer was formed. There was a similar observation in the fluorination of pure crystalline $C_{60}$s where, because the molecules packed together so well, fluorine is unable to penetrate the fullerene lattice under mild reaction conditions and the outer layer of molecules became highly fluorinated before the inner ones were even touched (Taylor et al., J. Chem. Soc. Perkin. Trans. 2 181 (1995)).

When the O-phase polymer was fluorinated at 250° C. for one hour, the C—F mode, which is centered around 1160 cm$^{-1}$, now shows three well defined peaks at 1146, 1174 and 1215 cm$^{-1}$ (FIG. 4(e)). According to the analysis above, fewer different fluorinated components were formed at 250° C. This observation is consistent with the results of monomeric $C_{60}$ fluorination where high-purity single isomer were obtained only at temperatures over 200° C. (Taylor, Russ. Chem. Bull. 47, 823 (1998)). In contrast to the continuous broadening of the C—F mode with increasing temperature as seen in previous spectra, the width of the C—F mode in the current spectrum was ~30 cm$^{-1}$ less than that in the above one. EDS results also indicated that the fluorine amount in this sample was ~9% less than in the one fluorinated at 200° C. Other features of the IR spectrum showed evidence that it is actually the superimposition of two phases: the fluorinated O-polymer and pure $C_{60}$. The existence of $C_{60}$ was determined from its typical modes at 527 and 574 cm$^{-1}$, which were absent in the lower temperature products. X-ray diffraction analysis of the sample confirmed that it was the fcc crystalline $C_{60}$. It appears the monomeric $C_{60}$ resulted from depolymerization of the polymer. It is unusual that thus formed $C_{60}$ was not sufficiently fluorinated under the specific condition (i.e., at 250° C. and in a fluorine atmosphere).

T-phase $C_{60}$ polymer. Similar spectral analysis was carried out for the T-phase polymer. All expected odd modes were observed in the IR spectrum of the pristine T-phase polymer (FIG. 5(a)) except that the $G_u$(3) doublet at 762 and 765 cm$^{-1}$ is missing. Instead, a 759 cm$^{-1}$ mode appeared with no definite assignment. Also, low intensity caused the absence of some split modes. For example, the $H_u$(3) doublet was shown as a singlet at 641 cm$^{-1}$, the $H_u$(4) triplet appeared as a singlet at 932 cm$^{-1}$, and the $F_{2u}(5)$ doublet appeared as a singlet at 1340 cm$^{-1}$.

Figure 5:
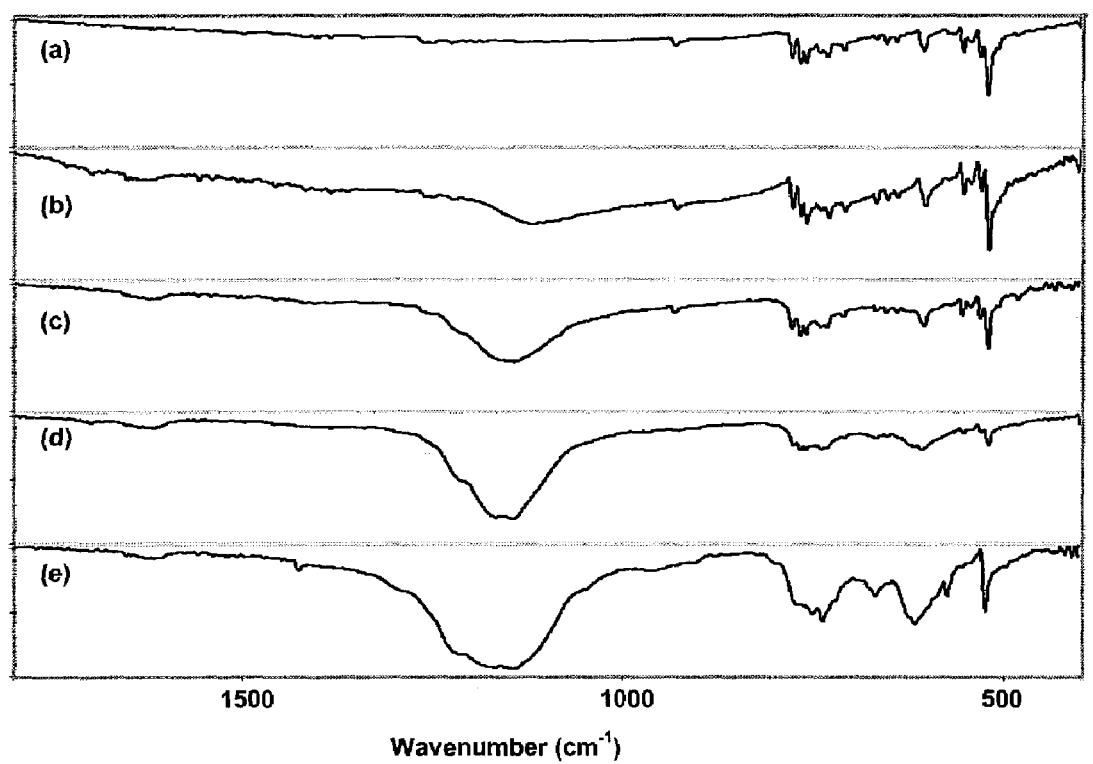
FIG. 5 illustrates IR spectra of T-phase polymer, wherein (a) is the pristine material, (b) is the material fluorinated at 100° C. for one hour (four times the original intensity), (c) is the material fluorinated at 150° C. for one hour, (d) is the material fluorinated at 200° C. for one hour, and (e) is the material fluorinated at 250° C. for one hour.

Fluorination of the T-phase polymer at 100° C. brought up a shallow and broad C—F stretching mode centering ~1116 cm$^{-1}$, as shown in FIG. 5(b), very similar to that of O-phase polymer. Other similar changes to the spectrum include intensity weakening and peaks downshifting for most IR modes, but there is no significant broadening of the peaks and no disappearance of the split modes. Considering that the T-phase polymer has a 2D polymerization pattern, it is possible that the fluorine attacks sites that are more limited than in the 1D O-phase polymer. This explains the lessened effect fluorine addition has on the existing IR modes.

Fluorination of the T-phase polymer at 150° C. brought the center of the C—F mode to ~1150 cm$^{-1}$ (FIG. 5(c)), which is a 35 cm$^{-1}$ upshift compared to the sample fluorinated at 100° C. It also activated the low frequency mode at 483 cm$^{-1}$. Similarly, the C—F mode shows a very "shallow" shoulder on its high frequency side, implying more covalent bond nature. The detectable broad feature shown up between 710 and 780 cm$^{-1}$ is indicative of the formation of new bonding structure due to fluorine addition.

Fluorination of the T-phase polymer at 200° C. caused another 10 cm$^{-1}$ upshift of the C—F mode (FIG. 5(d)). With the further weakening of the modes in the fingerprint region (400–800 cm$^{-1}$), two broad features turned up at 580–640 cm$^{-1}$ and 720–780 cm$^{-1}$, respectively. As discussed in the O-phase polymer portion, these two features imply the formation of a highly fluorinated polymeric phase. Based on the IR spectrum alone, there is much less intact polymer in this sample compared with that of the O-phase polymer since there are more covalent bonds formed between $C_{60}$ cages of T polymer. The effect of temperature on the lattice vibration is much less than that of the O-phase polymer. This could be a critical factor that determines a more sufficient diffusion of fluorine into the crystal lattices leading to a more complete fluorination throughout the sample.

When the T-phase polymer was fluorinated at 250° C. for an hour, in the IR spectrum, the C—F mode became a broad feature spanned over 200 cm$^{-1}$ in width and centered ~1170 cm$^{-1}$ with no improved fine structure (FIG. 5(e)). IR also showed apparent evidence of $C_{60}$ formation, with the specific modes at 526, 574, and 1427 cm$^{-1}$. Also, the broad features between 580–640 cm$^{-1}$ and 710–790 cm$^{-1}$ were enhanced.

R-phase $C_{60}$ polymer. The IR of the pristine R-phase polymer is consistent with the published data. After fluorination at 100° C. for one hour, a broad and asymmetric C—F feature showed up between 1020 and 1200 cm$^{-1}$, with a steep edge at the low frequency end and an extended tail at the high frequency end (FIG. 6(a)). It indicates that the C—F bonds formed are mostly semi-covalent. Another notable change is the activation of several IR-silent even modes: the $F_{2g}$ (1) mode at 534 cm$^{-1}$, which appeared as a fairly strong mode; the $F_{1g}$ (3) mode at 1495 cm$^{-1}$; the $F_{2g}$ (4) at 1524 cm$^{-1}$; and the $G_g$ (6) mode at 1619 cm$^{-1}$. All the pristine polymer modes experienced an intensity drop but stayed well defined.

Figure 6:
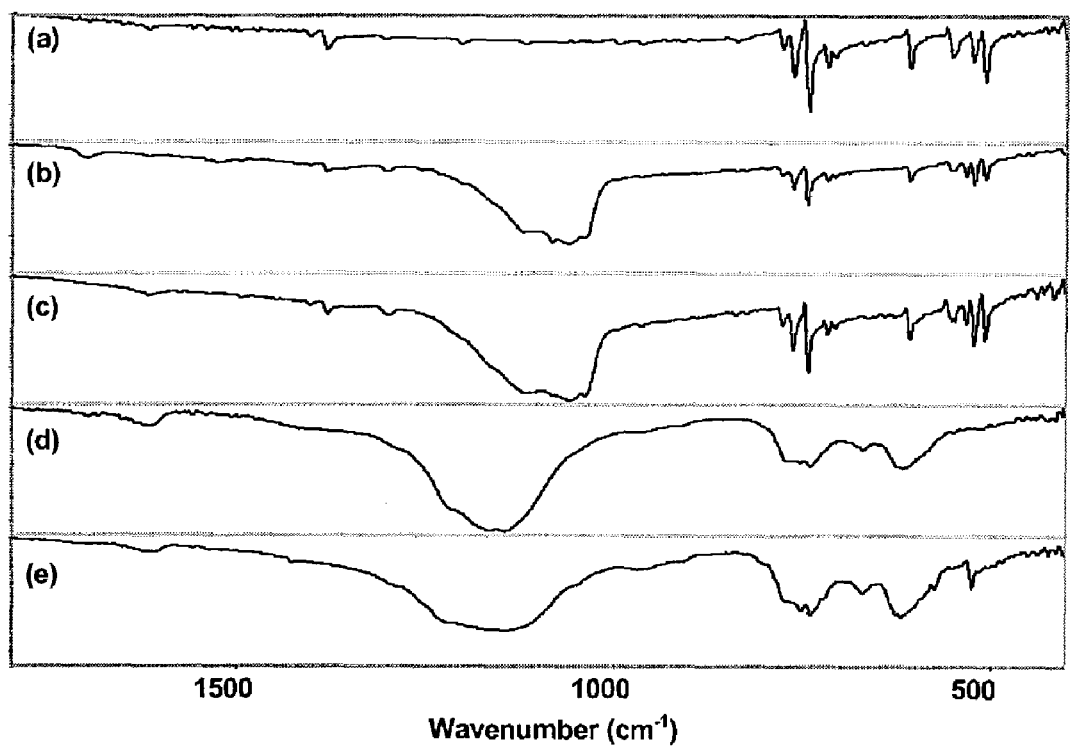
FIG. 6 illustrates IR spectra of R-phase polymer, wherein (a) is the pristine material (twice the original intensity), (b) is the material fluorinated at 100° C. for one hour (twice the original intensity), (c) is the material fluorinated at 150° C. for one hour (twice the original intensity), (d) is the material fluorinated at 200° C. for one hour, and (e) is the material fluorinated at 250° C. for one hour.

Fluorination of the R-phase polymer at 150° C. for an hour resulted a broader C—F feature in the IR that extended from 1010 to ~1230 cm$^{-1}$ (FIG. 6(c)). Compared with FIG. 6(b), the broadening is mainly at the high frequency side, and the intensity of the C—F mode increased. Apparently, at 150° C., not only were more C—F bonds formed, but the bond strength is enhanced. There is no further intensity decreasing of all the polymer fingerprint features. Instead, the intensities are higher than those in FIG. 6(b). This seems inconsistent with the fact that the fluorine addition amount was ~10% higher at 150° C. unless the fluorination at 150° C. was highly localized in certain parts of the sample and still left other parts intact. It is very possible that the competition between fluorine addition and fluorine diffusion caused such a result.

The IR spectrum of the sample fluorinated at 200° C. is quite simple (FIG. 6(d)). The C—F mode became more symmetric and its center shifted to ~1160 cm$^{-1}$. All fingerprint features of the pristine polymer are covered by three broad "humps" in 400–800 cm$^{-1}$ range, centered at 617 cm$^{-1}$, 669 cm$^{-1}$ and 755 cm$^{-1}$, respectively. The general features of the IR suggest a single-phase product, which was consistent with the XRD result.

There is no shift of the C—F mode between the sample fluorinated at 250° C. (FIG. 6(e)) and the one fluorinated at 200° C., though the peak was broader and the intensity was lower. The latter is consistent with the elemental analysis results that showed that the F/C ratio in this sample was lower than that of the sample fluorinated at 200° C. Also, similar to the fluorination of O-phase and T-phase polymers at 250° C., there are features of $C_{60}$ in the spectrum.

XRD

According to the established structure parameters (Davydov et al., *Phys. Rev. B* 61, 11936 (2000)), the distances between the covalently bonded $C_{60}$ cages of all three $C_{60}$ polymers (9.0–9.2 Å) are much smaller than the cell parameter of fcc $C_{60}$ (14.17 Å). The packing patterns of the buckyballs ($C_{60}$) within various polymers apparently influence the diffusion of fluorine into the crystalline structure and therefore affect the fluorine addition reactions. What follows is a detailed discussion of the XRD patterns of products formed at various temperatures.

Figure 7:
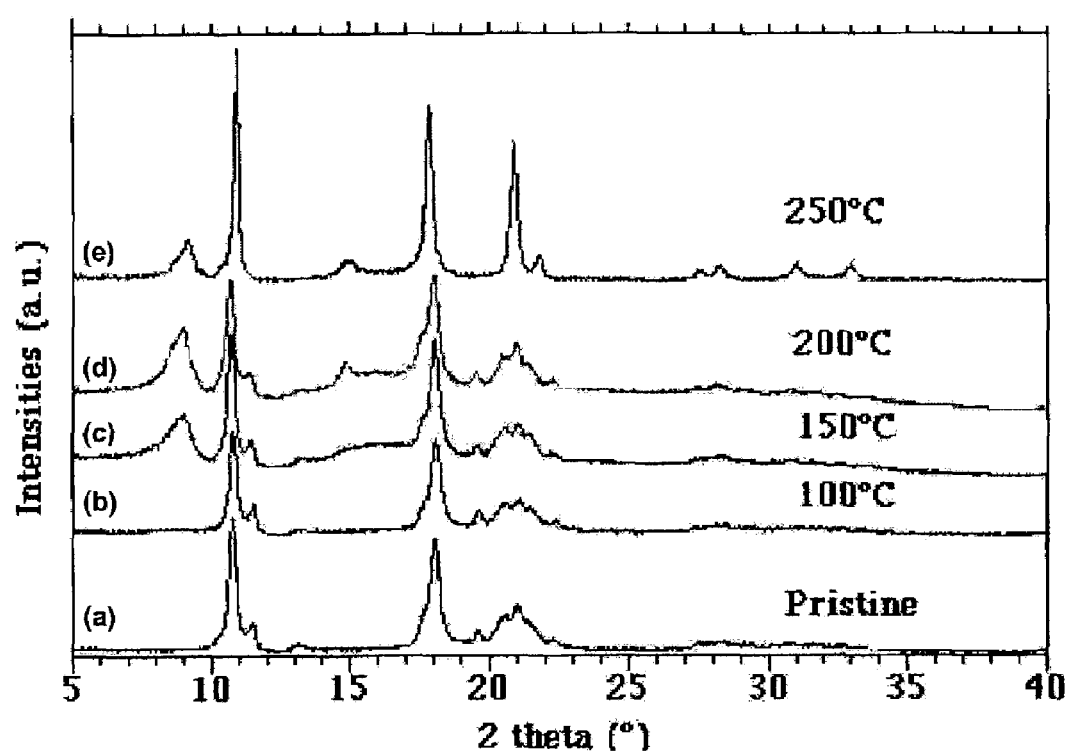
FIG. 7 illustrates XRD patterns of O-phase polymer, wherein (a) is the pristine material, (b) is the material fluorinated at 100° C. for one hour, (c) is the material fluorinated at 150° C. for one hour, (d) is the material fluorinated at 200° C. for one hour, and (e) is the material fluorinated at 250° C. for one hour.

O-phase polymer. FIG. 7 illustrates XRD patterns of O-phase polymer, wherein (a) is the pristine material, (b) is the material fluorinated at 100° C. for one hour, (c) is the material fluorinated at 150° C. for one hour, (d) is the material fluorinated at 200° C. for one hour, and (e) is the material fluorinated at 250° C. for one hour. Fluorination at 100° C. does not change the XRD pattern much as one compares FIGS. 7(a) and (b). It was already determined by elemental analysis that the average fluorine addition amount at this temperature is only ~10 fluorine atoms per $C_{60}$ cage. The XRD result implies that most of the fluorine only attached to the surface or interstitial space of the polymer, that will not change the crystalline structure of the polymer. Referring to FIG. 7(c), a new feature appeared at 2θ=9°. It has been reported that all XRD patterns of fluorinated $C_{60}$ ($C_{60}F_x$) have this feature (Okino et al., *Fullerene Sci. Tech.* 1, 425 (1993)). It is believed that the effective sizes of the fluorinated $C_{60}$ molecules are essentially the same regardless of the number of fluorine atoms attached to them as long as x≧20. However, this is not true in the case of fluorinated $C_{60}$ polymer, because of the covalent bonding between $C_{60}$ cages and as the number of sites available for fluorine addition, without affecting the inter-cage bonding, is limited. Beyond that limit, the polymers will either experience significant change of crystalline structure or depolymerize. Referring to FIG. 7(c), there is a broad feature which shows up between 2θ=14–17°. It narrows into a new peak at 2θ=14.8° in FIG. 7(d). Crystalline fluorinated $C_{60}$s also have feature in this range (Kawasaki et al., *J. Phys. Chem. B* 103, 1223 (1999)). It implies the formation of a new crystalline structure due to fluorine addition. The feature at 2θ=9° increased in intensity in FIG. 7(d), implying an increased amount of fluorine addition. The XRD pattern in FIG. 7(e) changed dramatically compared to other patterns in FIG. 7: all pristine O-phase features completely disappeared. Instead, strong and sharp features of fcc $C_{60}$ showed up, i.e. $2\theta=10.88°$ (very strong), $2\theta=17.87°$ (very strong), $2\theta=20.95°$ (very strong), $2\theta=21.82°$ (strong), $2\theta=27.68°$ (medium), $2\theta=28.36°$ (medium), $2\theta=31.19°$ (medium), and $2\theta=33.15°$ (medium). Also presented are the two features ($2\theta=9°$ and 15°) representing the fluorinated fullerene species. It is noted that the feature at $2\theta=9°$ decreased in intensity, which is consistent with the EDS results, which showed that the fluorine amount was lower in this sample.

Figure 8:
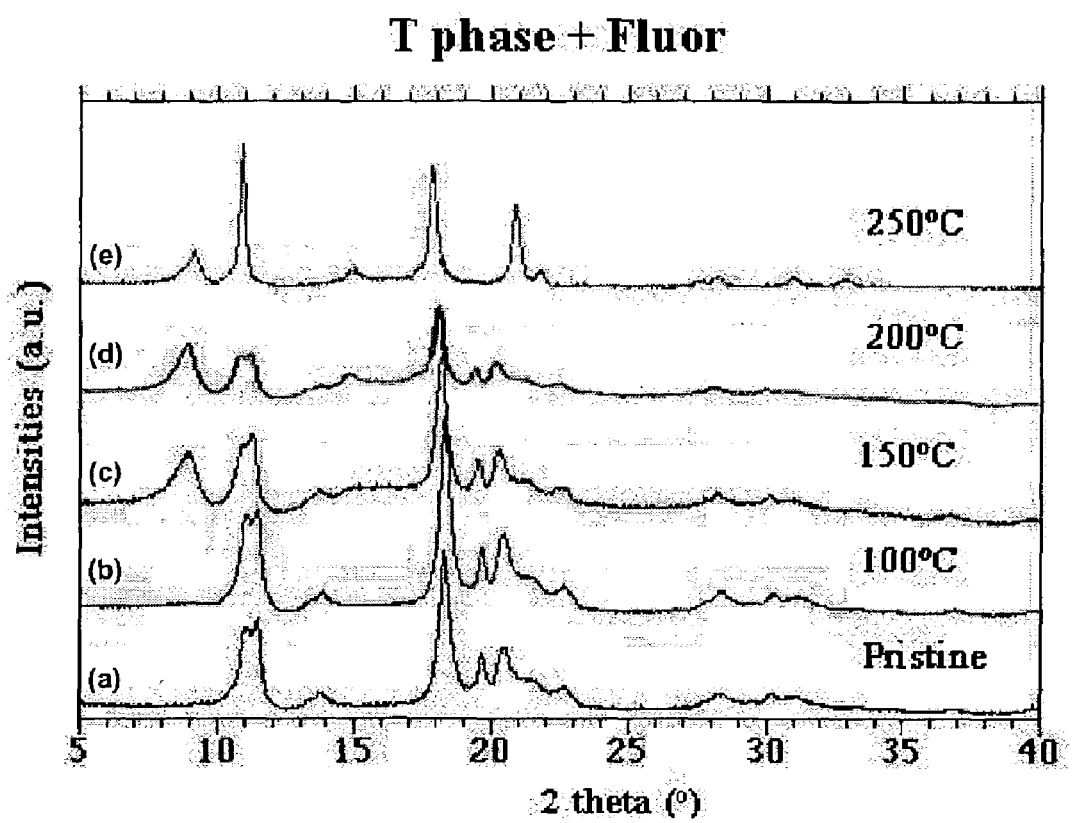
FIG. 8 illustrates XRD patterns of T-phase polymer, wherein (a) is the pristine material, (b) is the material fluorinated at 100° C. for one hour, (c) is the material fluorinated at 150° C. for one hour, (d) is the material fluorinated at 200° C. for one hour, and (e) is the material fluorinated at 250° C. for one hour.

T-phase polymer. The variation of XRD patterns of T-phase polymer fluorinated at different temperatures shows behavior that is very similar to the O-phase. FIG. 8 illustrates XRD patterns of T-phase polymer, wherein (a) is the pristine material, (b) is the material fluorinated at 100° C. for one hour, (c) is the material fluorinated at 150° C. for one hour, (d) is the material fluorinated at 200° C. for one hour, and (e) is the material fluorinated at 250° C. for one hour. There is no detectable change when fluorinated at 100° C. (FIG. 8(b) compared to FIG. 8(a)). The $2\theta=9°$ feature appeared when the sample fluorinated at 150° C. (FIG. 8(c)). Its intensity increased in FIG. 8(d), but decreased in FIG. 8(e). A broad feature also showed up in the range of $2\theta=14–17°$ in FIG. 8(c) and developed into a narrow peak at $2\theta=14.9°$. When fluorinated at 250° C., the XRD pattern also looks like a mixture of fluorinated fullerenes and unfluorinated fcc $C_{60}$.

Figure 9:
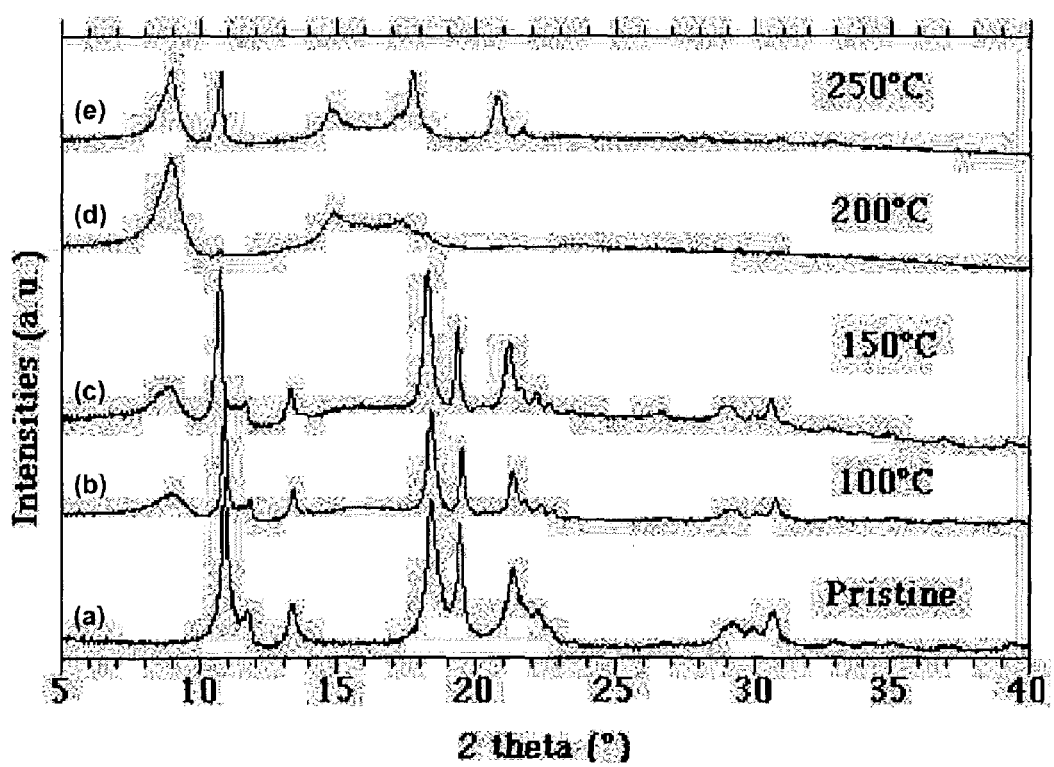
FIG. 9 illustrates XRD patterns of R-phase polymer, wherein (a) is the pristine material, (b) is the material fluorinated at 100° C. for one hour, (c) is the material fluorinated at 150° C. for one hour, (d) is the material fluorinated at 200° C. for one hour, and (e) is the material fluorinated at 250° C. for one hour.

R-phase polymer. FIG. 9 illustrates XRD patterns of R-phase polymer, wherein (a) is the pristine material, (b) is the material fluorinated at 100° C. for one hour, (c) is the material fluorinated at 150° C. for one hour, (d) is the material fluorinated at 200° C. for one hour, and (e) is the material fluorinated at 250° C. for one hour. Fluorination of R-phase polymer at 100° C. already displayed the feature at $2\theta=9°$. With the highest fluorine uptake ratio among the three polymers at this temperature, and with fewer available sites per $C_{60}$ cage, the influence of fluorine addition to the crystalline structure is within expectation. Fluorination at 150° C. did not change the XRD pattern further except that the $2\theta=9°$ feature increased in intensity. However, the fluorination at 200° C. extinguished all features of the pristine R-phase polymer and the pattern consists of only the strong $2\theta=9°$ feature and the two overlapping broad features at $2\theta=\sim14.8°$ and $2\theta=\sim17.2°$. Apparently, a new phase that is completely different from the pristine polymer had formed under the condition. It is believed that this is the highly fluorinated R-phase polymer. According to EDS, the formula of the fluorinated product corresponds to $C_{60}F_{42}$. Since the R-phase polymer only has 48 sites per $C_{60}$ cage available for fluorine addition, there is little chance of forming multiple isomers with formula $C_{60}F_{42}$. This could be the reason why only R-phase polymer forms the single-phase fluorinated product. FIG. 9(e) shows that fluorination of the R-phase polymer at 250° C. also yielded $C_{60}$. But, according to the relative intensity, the ratio of the fluorinated species is higher in this sample than that of O- and T-phase polymers.

Results from IR and XRD have confirmed that all three $C_{60}$ polymers decompose to monomeric $C_{60}$ at 250° C. in a fluorine atmosphere. But the fact that part of thus formed $C_{60}$ monomers were not fluorinated is somewhat unexpected. It has been reported that fcc $C_{60}$ gets fluorinated very slowly at temperatures lower than 300° C. (Taylor et al., *J. Chem. Soc. Perkin Trans.* 2 181 (1995)). It is observed that fluorination reaction rates of the $C_{60}$ polymers are significantly higher than that of the monomeric $C_{60}$. While not intending to be bound by theory, this likely results from the creation of reactive sites on the $C_{60}$ cages due to the covalent bond formation between the $C_{60}$ molecules during the polymerization process. It seems reasonable that, once the polymers decompose into $C_{60}$ monomers, the reactive sites caused by the inter-cage bonding also disappear, and no sufficient fluorination would occur on the fcc $C_{60}$ within 1 hour.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit, and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope, and concept of the invention as defined by the appended claims.

What is claimed is:

1. A product comprising:
   (a) polymeric $C_{60}$; and
   (b) fluorine, wherein the fluorine is attached to the polymeric $C_{60}$ forming a fluorinated polymeric $C_{60}$ product.

2. The product of claim 1, wherein the fluorine is covalently attached to a backbone of the polymeric $C_{60}$.

3. The product of claim 1, wherein the fluorinated polymeric $C_{60}$ product has a stoichiometry of $C_{60}F_x$, and wherein x ranges between about 0.1 and about 42.

4. The product of claim 1, wherein the fluorinated polymeric $C_{60}$ product is suspendable in a solvent selected from the group consisting of hexane, chloroform, ethylene diamine, methanol, isopropanol, and combinations thereof.

5. A product comprising:
   (a) polymeric $C_{60}$, wherein the polymeric $C_{60}$ is selected from the group consisting of O-phase, T-phase, R-phase, and combinations thereof; and
   (b) fluorine, wherein the fluorine is attached to the polymeric $C_{60}$ forming a fluorinated polymeric $C_{60}$ product.

6. The product of claim 5, wherein the fluorine is covalently attached to a backbone of the polymeric $C_{60}$.

7. The product of claim 5, wherein the fluorinated polymeric $C_{60}$ product has a stoichiometry of $C_{60}F_x$, and wherein x ranges between about 0.1 and about 42.

8. The product of claim 5, wherein the fluorinated polymeric $C_{60}$ product is suspendable in a solvent selected from the group consisting of hexane, chloroform, ethylene diamine, methanol, isopropanol, and combinations thereof.

9. A product comprising:
   (a) polymeric $C_{60}$, wherein the polymeric $C_{60}$ is made by a high-temperature high-pressure process; and
   (b) fluorine, wherein the fluorine is attached to the polymeric $C_{60}$ forming a fluorinated polymeric $C_{60}$ product.

10. The product of claim 9, wherein the fluorine is covalently attached to a backbone of the polymeric $C_{60}$.

11. The product of claim 9, wherein the fluorinated polymeric $C_{60}$ product has a stoichiometry of $C_{60}F_x$, and wherein x ranges between about 0.1 and about 42.

12. The product of claim 9, wherein the fluorinated polymeric $C_{60}$ product is suspendable in a solvent selected from the group consisting of hexane, chloroform, ethylene diamine, methanol, isopropanol, and combinations thereof.

13. The product of claim 9, wherein the polymeric $C_{60}$ is selected from the group consisting of O-phase, T-phase, R-phase, and combinations thereof.

* * * * *